(12) United States Patent
Jiang et al.

(10) Patent No.: US 11,206,359 B2
(45) Date of Patent: Dec. 21, 2021

(54) IMAGE OUTPUTTING METHOD AND ELECTRONIC DEVICE

(71) Applicant: Altek Semiconductor Corp., Hsinchu (TW)

(72) Inventors: Bo-Wei Jiang, Hsinchu (TW); Hsiao-Min Wang, Hsinchu (TW); Jing-Yu Huang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 16/907,171

(22) Filed: Jun. 20, 2020

(65) Prior Publication Data

US 2020/0404148 A1    Dec. 24, 2020

(30) Foreign Application Priority Data

Jun. 24, 2019   (TW) .................................. 108121891

(51) Int. Cl.
    *H04N 5/235*    (2006.01)
(52) U.S. Cl.
    CPC ......... *H04N 5/2352* (2013.01); *H04N 5/2351* (2013.01)
(58) Field of Classification Search
    CPC .......................... H04N 5/2352; H04N 5/2351
    See application file for complete search history.

(56) References Cited

U.S. PATENT DOCUMENTS

| | | | |
|---|---|---|---|
| 8,228,400 B2 | 7/2012 | Liu et al. | |
| 10,154,220 B2 | 12/2018 | Vogelsang et al. | |
| 2004/0004666 A1* | 1/2004 | Sano | H04N 5/235 348/254 |
| 2008/0259175 A1* | 10/2008 | Muramatsu | H04N 5/23248 348/222.1 |
| 2010/0165163 A1* | 7/2010 | Matsuda | H04N 5/35572 348/302 |
| 2015/0062410 A1* | 3/2015 | Kim | H04N 5/23277 348/362 |

(Continued)

FOREIGN PATENT DOCUMENTS

| | | |
|---|---|---|
| CN | 101072303 | 11/2007 |
| CN | 101312500 | 11/2008 |

(Continued)

OTHER PUBLICATIONS

"Office Action of Taiwan Counterpart Application", dated Jul. 23, 2020, p. 1-p. 5.

(Continued)

*Primary Examiner* — Jason A Flohre
(74) *Attorney, Agent, or Firm* — JCIPRNET

(57) ABSTRACT

An image outputting method and an electronic device are provided. The method includes: shooting a scene by using a plurality of different exposure durations to obtain a plurality of images respectively; performing a summation operation according to the images to obtain a first image; adjusting a first brightness of the first image to an output brightness to generate a second image; respectively converting pixel values of a plurality of first pixels in the second image into other corresponding pixel values in another value domain to generate an output image; and outputting the output image.

12 Claims, 7 Drawing Sheets

(56) References Cited

U.S. PATENT DOCUMENTS

| | | | |
|---|---|---|---|
| 2015/0103190 A1 | 4/2015 | Corcoran et al. | |
| 2018/0220054 A1* | 8/2018 | Swami | G06T 5/50 |
| 2018/0367734 A1* | 12/2018 | Thumpudi | G11B 27/36 |
| 2020/0412934 A1* | 12/2020 | Hirota | H04N 5/23245 |

FOREIGN PATENT DOCUMENTS

| | | |
|---|---|---|
| CN | 101472076 | 7/2009 |
| CN | 101547315 | 9/2009 |
| CN | 102769756 | 11/2012 |
| CN | 103024300 | 4/2013 |
| CN | 104835131 | 8/2015 |
| CN | 107124561 | 9/2017 |
| TW | I390970 | 3/2013 |
| TW | 201526640 | 7/2015 |
| TW | I649722 | 2/2019 |
| WO | 2018231431 | 12/2018 |

OTHER PUBLICATIONS

"Office Action of China Counterpart Application", dated Jun. 18, 2021, p. 1-p. 7.

\* cited by examiner

IMAGE OUTPUTTING METHOD AND ELECTRONIC DEVICE

CROSS-REFERENCE TO RELATED APPLICATION

This application claims the priority benefit of Taiwan application serial no. 108121891, filed on Jun. 24, 2019. The entirety of the above-mentioned patent application is hereby incorporated by reference herein and made a part of this specification.

BACKGROUND OF THE INVENTION

1. Field of the Invention

The invention relates to an image outputting method and an electronic device.

2. Description of Related Art

In general, brightness is the product of multiplying exposure duration by ISO value. When taking a long exposure image by exposing for a longer period of time, if the user's hand holding the camera vibrates excessively, the long exposure image that is captured may be blurred due to shaking of his/her hand. To prevent the situation from happening, it is common to capture a plurality of short exposure images having a shorter exposure duration and synthesize the short exposure images into a single image to generate an image having the same brightness as that of the long exposure image, thereby preventing the issue resulting from the vibration of the user's hand from happening. For example, according to the conventional technology, in a case where the user intends to capture a long exposure image whose exposure duration is 30 ms, ISO value is 300, and brightness is 9000, three short exposure images whose exposure duration is 20 ms, ISO value is 150, and brightness is 3000 may be captured, for example. Then, the three short exposure images may be subjected to motion compensation and added to each other to generate an output image having the same brightness (i.e., 9000) as that of the long exposure image.

Particularly, since the short exposure images are less likely to be blurred due to hand vibration, the output image generated by adding the short exposure images to each other may exhibit less blurredness attributable to hand vibration. However, in the conventional technology, the short exposure images to be combined with each other usually have the same exposure duration.

It should also be noted that, when the ambient light is quite low, a short exposure image captured with a shorter exposure duration may easily have erroneous signals (or insufficient signals), which leads to erroneous results when the erroneous signals are superimposed to each other. Therefore, when the short exposure images are synthesized to form the output image, the added signals may easily exceed the value domain. In this situation, it is difficult to preserve the details if overflow signals are directly discarded. Besides, if the short exposure images contain noise, the signals of the short exposure images may result in amplified noise in the output image during the process of adding images.

SUMMARY OF THE INVENTION

The invention provides an image outputting method and an electronic device capable of forming an output image having the same brightness as that of a long exposure image by synthesizing a plurality of short exposure images having different exposure durations.

An embodiment of the invention provides an image outputting method for an electronic device. The method includes: shooting a scene by respectively using a plurality of different exposure durations to obtain a plurality of images; performing a summation operation according to the images to obtain a first image; adjusting a first brightness of the first image to an output brightness to generate a second image; respectively converting pixel values of a plurality of first pixels in the second image into other corresponding pixel values in another value domain to generate an output image; and outputting the output image.

An embodiment of the invention provides an electronic device. The electronic device includes an image capturer and a processor. The image capturer shoots a scene by respectively using a plurality of different exposure durations to obtain a plurality of images. The processor performs a summation operation according to the images to obtain a first image. The processor adjusts a first brightness of the first image to an output brightness to generate a second image. The processor respectively converts pixel values of a plurality of first pixels in the second image into other corresponding pixel values in another value domain to generate an output image.

The processor outputs the output image.

Based on the above, the image outputting method and the electronic device according to the embodiments of the invention may determine the exposure duration according to the degree of hand vibration at the moment when the camera captures an image and further shoot a plurality of short exposure images having different exposure durations. Then, the short exposure images are synthesized into the output image having the same brightness as that of a long exposure image. In this way, the output image may have the same brightness as that of the long exposure image while exhibiting reduced noise and preserving image details. Besides, in the embodiments of the invention, the exposure duration of the short exposure image is dynamically determined. Therefore, a short exposure image having a longer exposure duration may be obtained. Consequently, the number of short exposure images that need to be shot is reduced, and the issue of having an excessively high error rate due to performing motion compensation on an excessive number of short exposure images is also alleviated.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
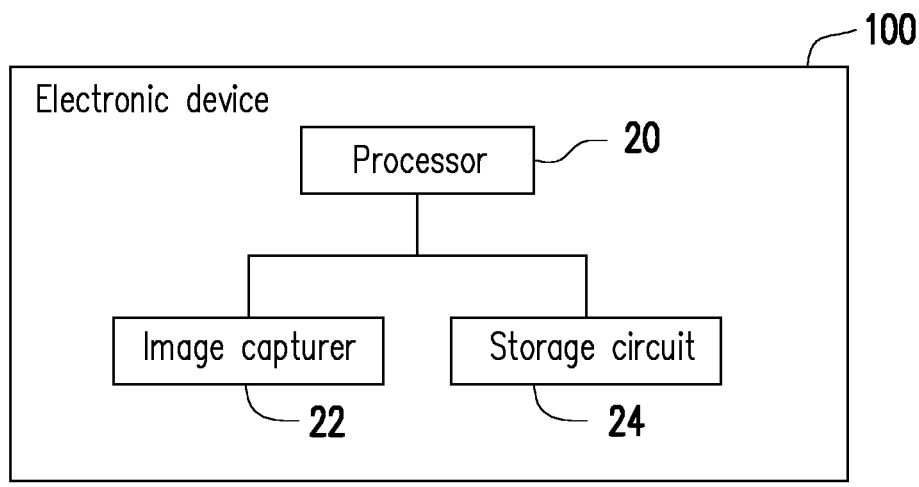
FIG. 1 is a schematic view of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of an electronic device according to an embodiment of the invention.

Referring to FIG. 1, an electronic device 100 includes a processor 20, an image capturer 22, and a storage circuit 24. The image capturer 22 and the storage circuit 24 are respectively coupled to the processor 20. The electronic device 100 is an electronic device such as a camera, a mobile phone, a tablet computer, a laptop computer, etc. The invention does not intend to impose a limitation on this regard.

The processor 20 may be a central processing unit (CPU) or other programmable general purpose or specific purpose microprocessors, digital signal processors (DSPs), programmable controllers, application specific integrated circuits (ASICs), other similar components, or a combination of the components.

The image capturer 22 is configured to capture (or shoot) one or more images. For example, the image capturer 22 may be an image capturing lens that is built in or externally connected to the electronic device 100 and provided with a charge coupled device (CCD), a complementary metal-oxide semiconductor (CMOS) device, or other types of photosensitive devices. However, the invention is not limited thereto. In some embodiments, the electronic device 100 is a laptop computer, for example, and the image capturer 22 is a camera embedded above a display, for example.

The storage circuit 24 may be any type of fixed or movable random access memory (RAM), read-only memory (ROM), flash memory, similar components, or a combination of the components.

In the exemplary embodiment, the storage circuit 24 of the electronic device 100 stores a plurality of programming code segments. After being installed, the programming code segments are executed by the processor 20. For example, the storage circuit 24 includes a plurality of modules, and the respective operations of the electronic device 100 are respectively executed by the modules. In addition, each of the modules is formed by one or more of the programming code segments. However, the invention is not limited thereto. The respective operations of the electronic device 100 may also be implemented in other hardware forms.

Figure 2:
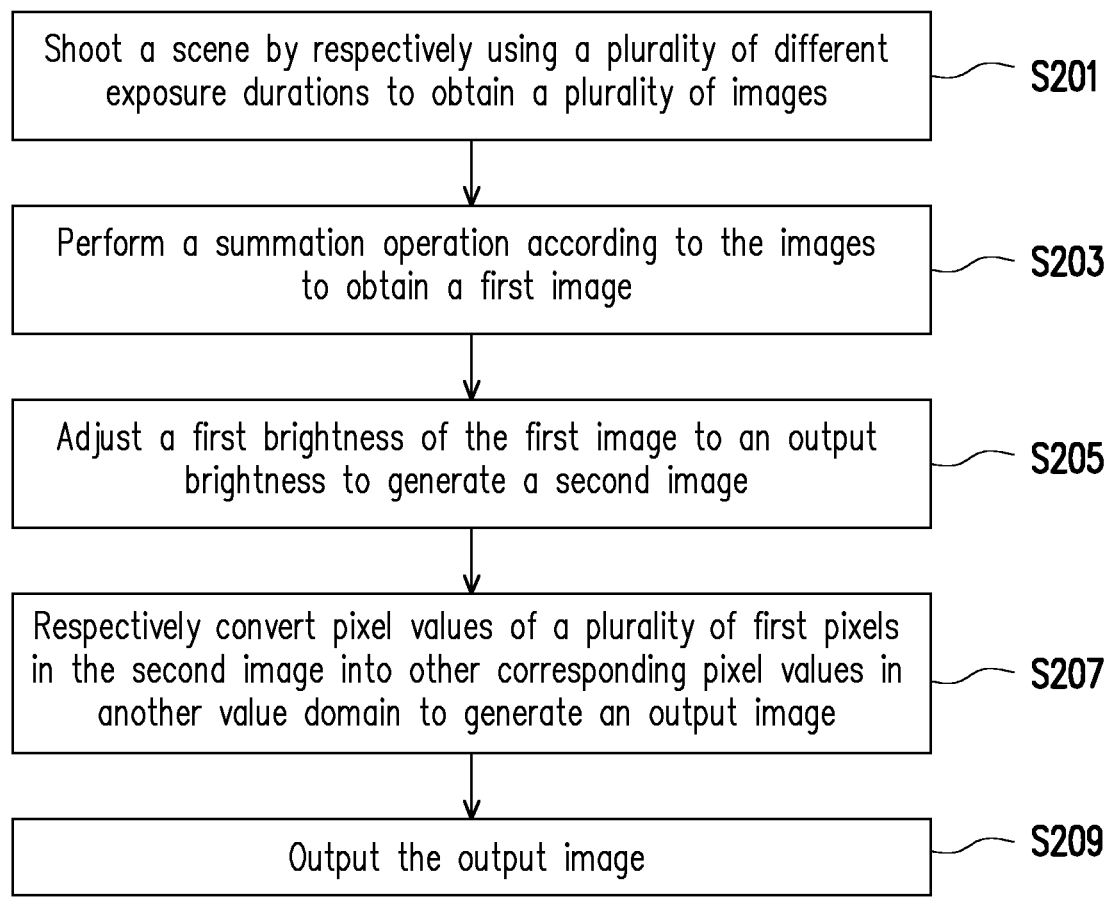
FIG. 2 is a flowchart illustrating an image outputting method according to an embodiment of the invention.

FIG. 2 is a flowchart illustrating an image outputting method according to an embodiment of the invention.

Referring to FIG. 2, in the embodiment, the processor 20 may control the image capturer 22 to shoot a scene by respectively using a plurality of different exposure durations, so as to obtain a plurality of images (Step S201). In other words, the images may respectively have different exposure durations. In particular, the images obtained in Step S201 are short exposure images. Details of Step S201 are as shown in FIG. 3.

Figure 3:
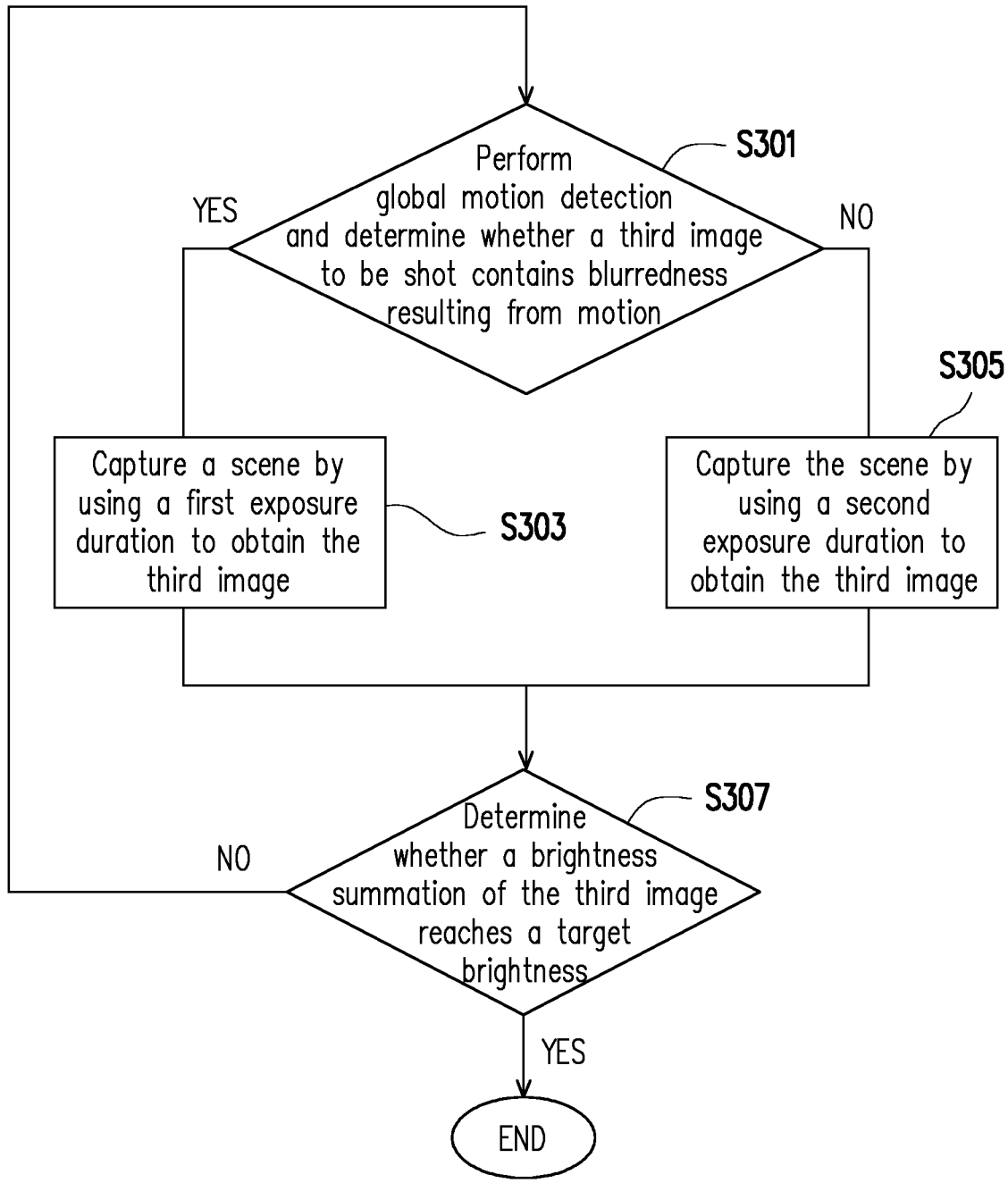
FIG. 3 is a detailed flowchart of Step S201 according to an embodiment of the invention.

FIG. 3 is a detailed flowchart of Step S201 according to an embodiment of the invention.

Referring to FIG. 3, first of all, when the scene is to be shot, the processor 20 may firstly perform global motion detection and determine whether an image (also referred to a third image) currently to be shot contains blurredness resulting from motion (or hand vibration) (Step S301). In an embodiment, the electronic device 100 may further include a gravity sensor (not shown), for example. The gravity sensor is, for example, a gyroscope or other similar components. The processor 20 may acquire a degree of hand vibration of the user according to a value sensed by the gravity sensor. For example, when the value sensed by the gravity sensor is greater than a threshold, the processor 20 may determine that the third image currently to be shot contains blurredness resulting from motion (or hand vibration). Comparatively, when the value sensed by the gravity sensor is not greater than the threshold, the processor 20 may determine that the third image currently to be shot does not contain blurredness resulting from motion (or hand vibration).

Besides, when the image capturer 22 is used to shoot images of a scene, the image capturer 22 may continuously capture images of the scene for the user to view in a real-time manner and adopts an image captured at the moment when the user hits the shutter as an image that is shot after the user hits the shutter. Therefore, in another embodiment, before the shutter is hit to shoot the third image, the electronic device 100 may also obtain two images captured before the time point at which the shutter is hit, adjust the brightness of the two images to the same brightness, and subtract the two images with respect to each other. When the value obtained through subtraction is greater than a threshold, the processor 20 may determine that the third image currently to be shot contains blurredness resulting from motion (or hand vibration). Comparatively, when the value obtained through subtraction is not greater than the threshold, the processor 20 may determine that the third image currently to be shot does not contain blurredness resulting from motion (or hand vibration).

When the third image to be shot contains blurredness resulting from motion, the processor 20 may control the image capturer 22 to shoot the scene by using an exposure duration (also referred to a first exposure duration) to obtain the third image (Step S303). When the third image to be shot does not contain blurredness resulting from motion, the processor 20 may control the image capturer 22 to shoot the scene by using another exposure duration (also referred to a second exposure duration) to obtain the third image. Specifically, the second exposure duration is greater than the first exposure duration.

In other words, when the third image to be shot contains blurredness resulting from motion, since the image capturer 22 shoots by using the shorter first exposure duration, the blurredness generated in the third image that is shot is less significant. When the third image to be shot does not contain blurredness resulting from motion, since the image capturer 22 shoots by using the longer second exposure duration, more details can be retained in the third image that is shot. In this way, noise may be reduced when an image summation operation is performed subsequently.

After the third image is obtained, the processor 20 may determine whether a brightness summation of the third image reaches a target brightness (Step S307), and when the brightness summation of the third image has not reached the target brightness, the processor 20 may perform Steps S301 to 307 again to shoot and obtain more images. When the brightness summation of the third images reaches the target brightness, the processor 20 may end the process of FIG. 3.

In other words, at Step S201, the processor 20 may control the image capturer 22 to repetitively perform shooting by using different exposure durations according to the result of global motion detection, so as to obtain a plurality of images and determine whether the brightness summation of the images reaches the target brightness. When the brightness summation of the images has not reached the target brightness, the processor 22 may control the image capturer 22 to repetitively shoot the scene to obtain more images until the brightness summation of the obtained images reaches the target brightness. Particularly, the target brightness, the first exposure duration, and the second exposure duration may be set in advance in the electronic device 100, and the target brightness, the first exposure duration, and the second exposure duration may be correspondingly set through auto exposure according to the brightness of an output image which the user intends to obtain.

Referring to FIG. 2 again, after Step S201 is executed, the processor 20 may perform a summation operation according to the images obtained in Step S201 to obtain an image (also referred to as a first image) (Step S203). More specifically, FIG. 4 is a detailed flowchart of Step S203 according to an embodiment of the invention.

Figure 4:
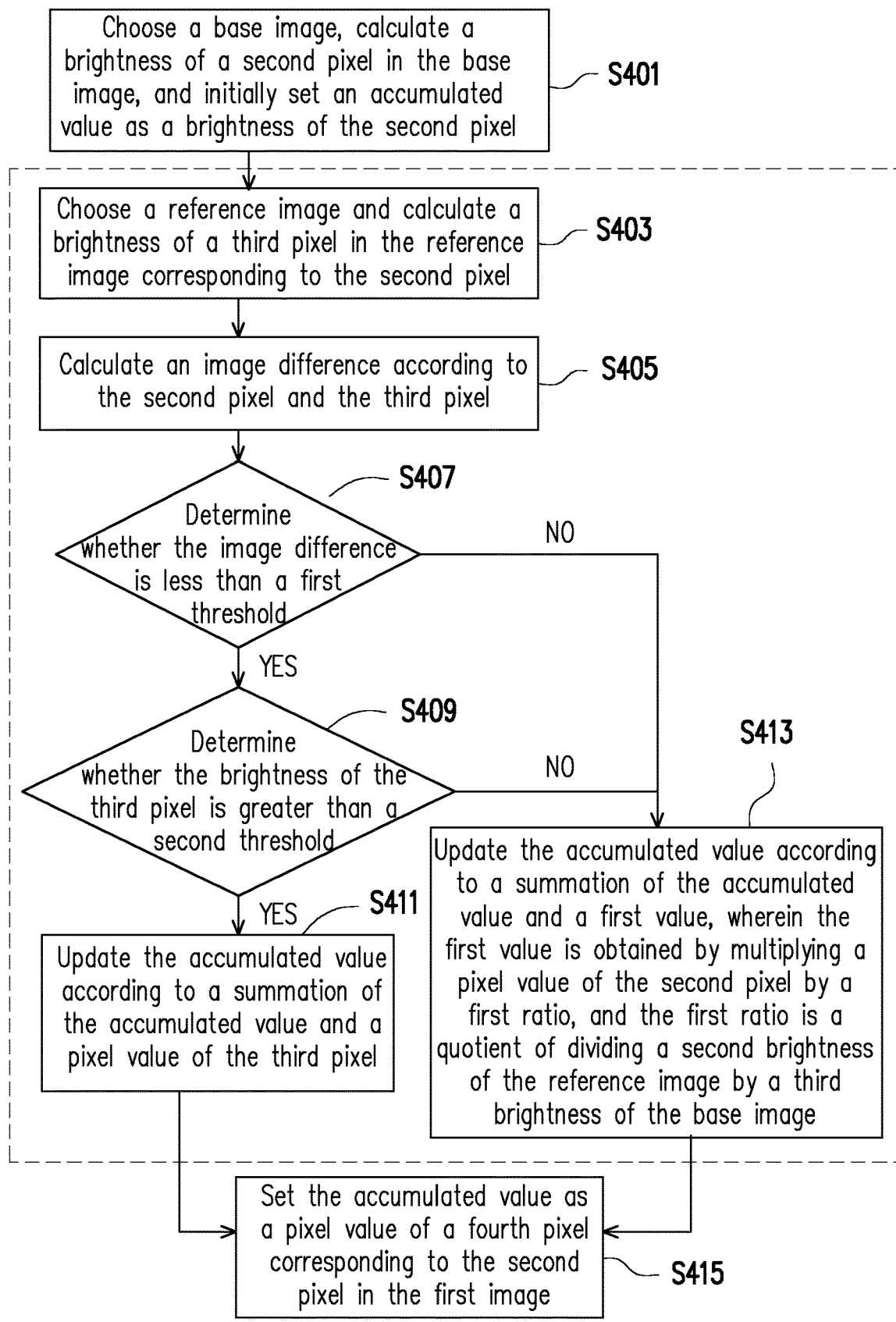
FIG. 4 is a detailed flowchart of Step S203 according to an embodiment of the invention.

Referring to FIG. 4, in the embodiment, the processor 20 may choose one of the images obtained in Step S201 as a base image. The processor 20, for example, may calculate the brightness of each pixel in the base image by using a luminance filter. It should be noted that the example in FIG. 4 is described from the perspective of a pixel (also referred to as a second pixel) in the base image, and the processor may initially set an accumulated value as the brightness of the second pixel (Step S401).

Similarly, the processor 20 may adopt remaining images other than the base image among the images obtained at Step S201 as reference images. The processor 20 may calculate the brightness of each pixel in the reference images. It should be noted that the example of FIG. 4 is described from the perspective of a pixel (also referred to as a third pixel) located at the same position as the second pixel in a reference image of the reference images (Step S403).

Then, the processor 20 calculates an image difference according to the brightness of the second pixel and the brightness of the third pixel to perform local motion detection (Step S405).

For example, the processor 20 may mask the base image by using a mask in a size of 3*3 pixels, so that the second pixel of the base image is located at the position of the pixel at the center of the mask, and calculate a summation of a parameter (e.g., a brightness summation, also referred to as a first brightness summation) for all the pixels of the base image in the mask. Similarly, the processor 20 may mask the reference images by using a mask in a size of 3*3 pixels, so that the third pixel of the reference images is located at the position of the pixel at the center of the mask, and calculate a summation of a parameter (e.g., a brightness summation, also referred to as a second brightness summation) for all the pixels of the reference images in the mask. The processor 20 may calculate the difference between the first brightness summation and the second brightness summation as the image difference corresponding to the second pixel.

After calculating the image difference, the processor 20 may determine whether the image difference is less than a first threshold (Step S407). When the image difference is less than the first threshold, the processor 20 may further determine whether the brightness of the third pixel is greater than a second threshold (Step S409). It should be noted that the invention does not intend to limit the values of the first threshold and the second threshold.

When the image difference is less than the first threshold and the brightness of the third pixel is greater than the second threshold, the processor 20 may add up the accumulated value and the pixel value of the third pixel, and update the accumulated value according to the summation after the addition. In other words, the processor 20 sets the summation of the accumulated value and the pixel value of the third pixel as the accumulated value (Step S411).

It should be noted that the image difference being not less than the first threshold indicates that there is a local motion between the second pixel and the third pixel. In addition, the brightness of the third pixel being not greater than the second threshold indicates that the brightness of the third pixel may be too low and the third pixel may contain excessive noise. Under the two conditions, a summed pixel value may be less accurate if the summed pixel value is obtained by directly adding the pixel value of the third pixel to the pixel value of the second pixel.

Therefore, in the exemplary embodiment, when the image difference is not less than the first threshold or the brightness of the third pixel is not greater than the second threshold, the processor 20 may update the accumulated value according to the summation of the accumulated value and a value (also referred to as a first value). In other words, the processor 20 sets the summation of the accumulated value and the first value as the accumulated value (Step S413). The first value is obtained by multiplying the pixel value of the second pixel by a first ratio, and the first radio is the quotient of dividing the overall brightness (also referred to as a second brightness) of the reference image by the overall brightness (also referred to as a third brightness) of the base image. In addition, the second brightness is the product of multiplying the exposure duration of the reference image by the ISO value of the reference image, and the third brightness is the product of multiplying the exposure duration of the base image by the ISO value of the base image.

Specifically, the processor 20 may perform the process from Step S403 to Step S413 in FIG. 4 on the pixel at the same position as the second pixel in each reference image, so as to continuously update the accumulated value. Then, the processor 20 may set the lastly derived accumulated value as the pixel value of a pixel (also referred to as a fourth pixel) of the first image at the same position of the second pixel. Besides, the processor 20 may respectively perform the process in FIG. 4 on all the pixels in the base image, so as to obtain the pixel value of each pixel in the first image.

It should be noted that the pixel value is a value (e.g., one of an R value, a G value, and a B value) stored by a pixel in a Bayer image, for example. However, the invention is not limited thereto. In other embodiments, the pixel value mentioned in Steps S411 and S413 may also be a value stored by a pixel in other color spaces.

Referring to FIG. 2, after Step S203 is performed, the processor 20 may adjust the brightness (also referred to as first brightness) of the first image to an output brightness to generate a second image (Step S205). More specifically, FIG. 5 is a detailed flowchart of Step S205 according to an embodiment of the invention.

Figure 5:
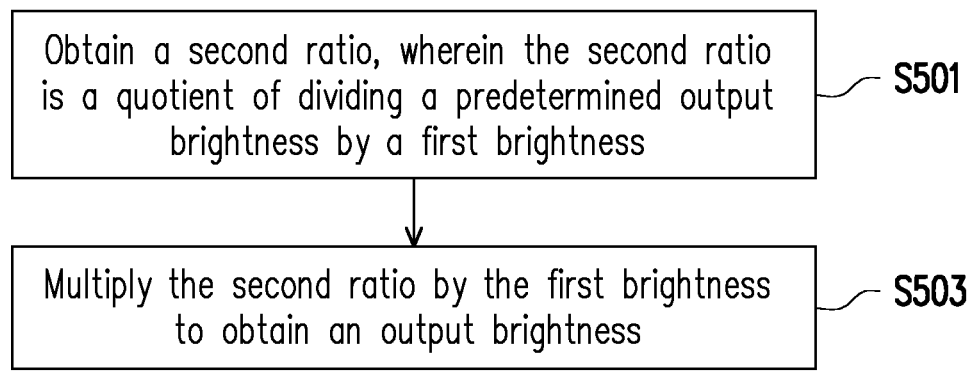
FIG. 5 is a detailed flowchart of Step S205 according to an embodiment of the invention.

Referring to FIG. 5, first of all, the processor 20 may obtain a second ratio (Step S501). The second ratio is the quotient of dividing a predetermined output brightness by the first brightness. Then, the processor 20 may multiply the second ratio by the first brightness to obtain the output brightness (Step S503) and adjust the brightness of the first image to the output brightness to generate the second image.

Figure 6:
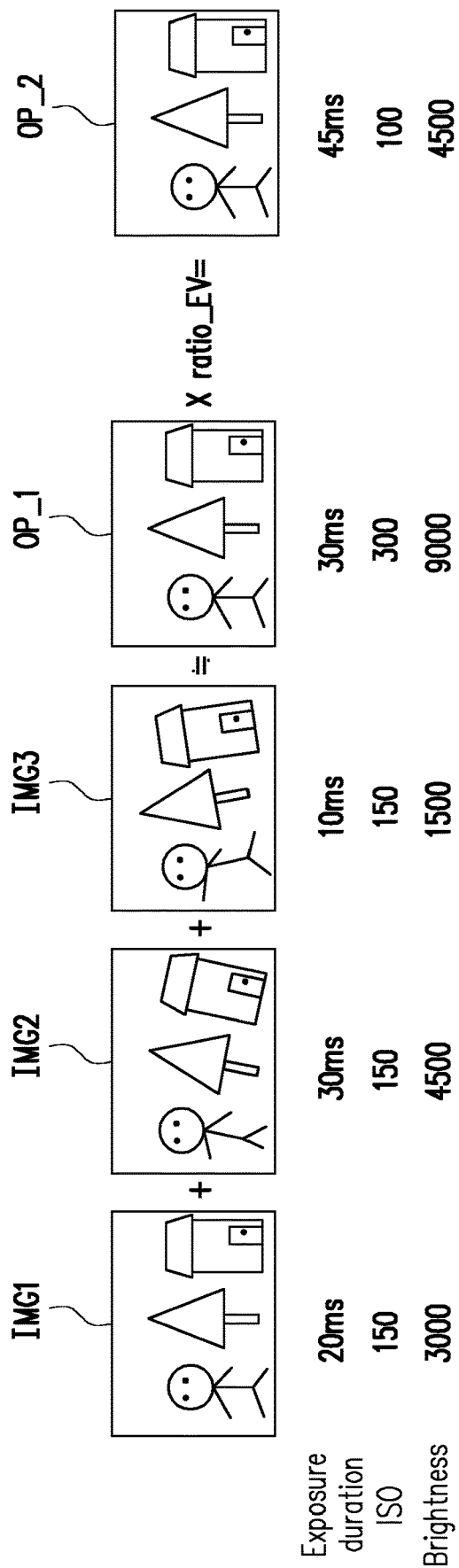
FIG. 6 is a schematic view illustrating obtaining a second ratio and generating a second image according to an embodiment of the invention.

For example, FIG. 6 is a schematic view illustrating obtaining a second ratio and generating a second image according to an embodiment of the invention.

Referring to FIG. 6, it is assumed that the user intends to obtain a long exposure image whose exposure duration is 45 ms and ISO value is 100. The brightness of the long exposure image is 4500, and the brightness is the predetermined output brightness. At this time, the processor 20 may perform Step S201 to obtain a plurality of short exposure images IMG1 to IMG3 having different exposure values. In addition, the exposure duration of the short exposure image IMG1 is 20 ms, the ISO value thereof is 150, and the brightness thereof is 3000. The exposure duration of the short exposure image IMG2 is 30 ms, the ISO value thereof is 150, and the brightness thereof is 4500. The exposure duration of the short exposure image IMG3 is 10 ms, the ISO value thereof is 150, and the brightness thereof is 1500. Then, the processor 20 may, for example, perform Step S205 to perform the summation operation on the short exposure images IMG1 to IMG3 to obtain a long exposure image OP_1 (i.e., the first image) whose exposure duration is 30 ms, ISO value is 300, and brightness is 9000. Specifically, since the long exposure image OP_1 has a higher brightness, and the user intends to obtain the long exposure image whose brightness is 4500, the processor 20 may divide the predetermined output brightness by the brightness of the long exposure image OP_1 to obtain the second ratio. In the example, the predetermined output brightness is 4500, and the brightness of the long exposure image OP_1 is 9000. Therefore, the quotient (i.e., the value ½) of dividing the predetermined output brightness by the brightness of the long exposure image OP_1 is the second ratio. In FIG. 6A, the second ratio is represented as "ratio EV". After obtaining the second ratio, the processor 20 may multiply the second ratio (i.e., the value ½) by the brightness (i.e., the value 9000) of the long exposure image OP_1 to obtain the output brightness (i.e., the value 4500), and adjust the brightness of the long exposure image OP_1 to the output brightness to generate a long exposure image OP_2 (i.e., the second image) whose brightness is 4500.

Specifically, since the long exposure image OP_1 has a higher brightness, the long exposure image OP_1 may retain more details. Therefore, when the brightness of the long exposure image OP_1 is adjusted to the output brightness to generate the image OP_2, the image OP_2 also has more details.

Referring to FIG. 2 again, after Step S205 is performed, the processor 20 may respectively convert the pixel values of a plurality of pixels (also referred to as first pixels) in the second image into other corresponding pixel values in another value domain to generate an output image (Step S207). Then, the processor 20 outputs the output image (Step S209).

Figure 7:
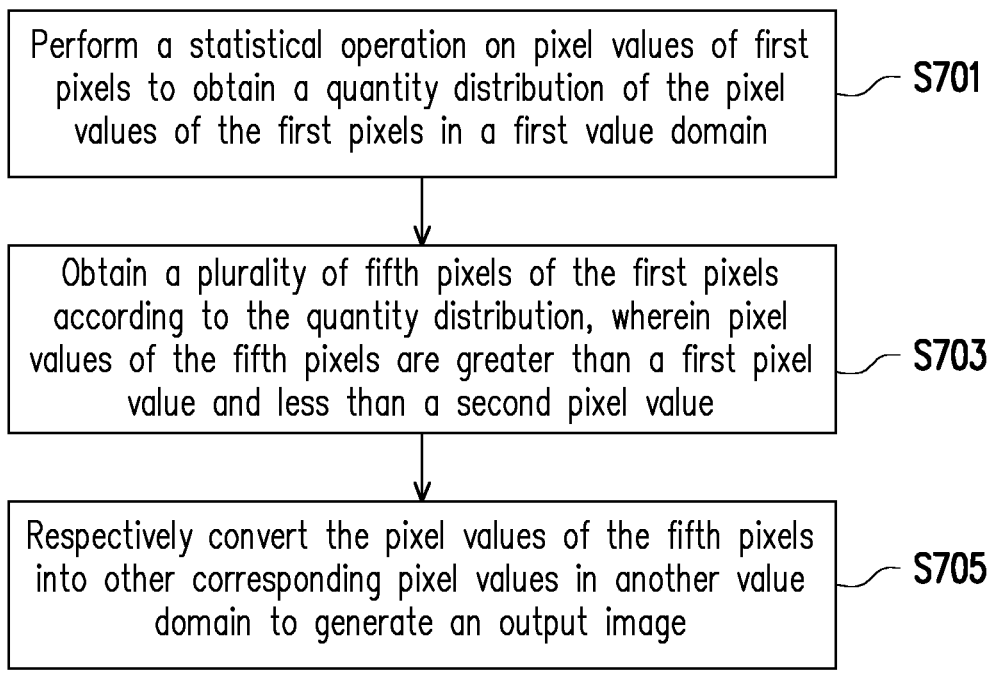
FIG. 7 is a detailed flowchart of Step S207 according to an embodiment of the invention.
Figure 8A:
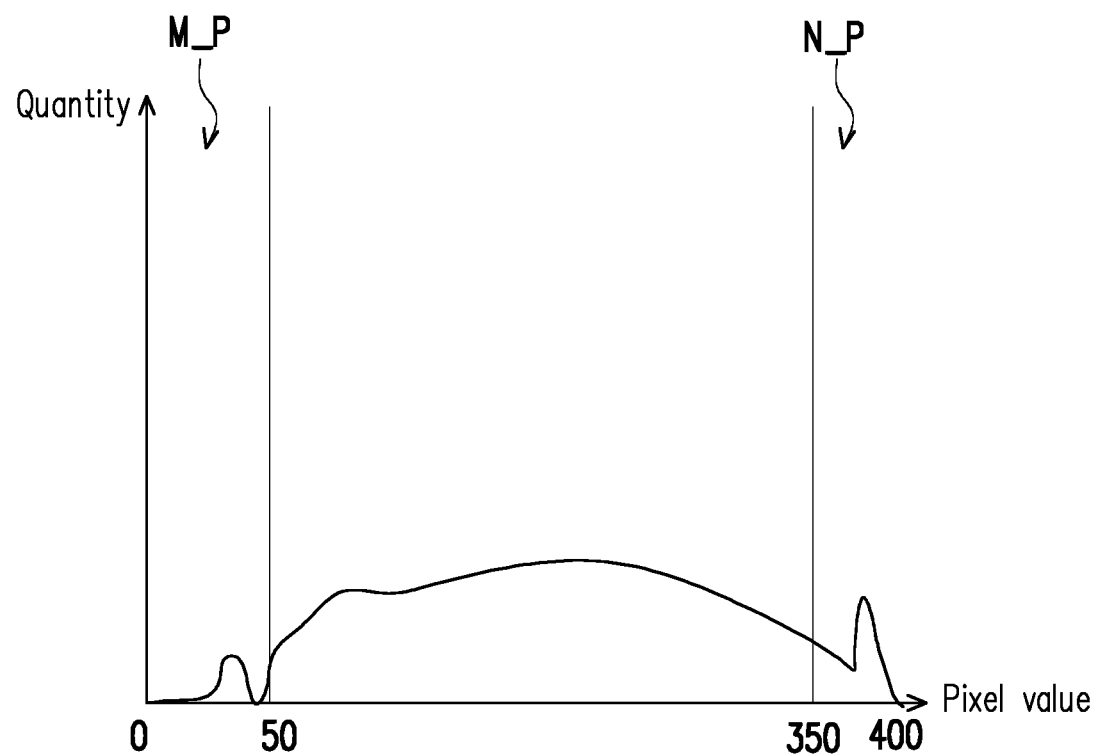
FIGS. 8A and 8B are schematic views illustrating pixel value conversion according to an embodiment of the invention.
Figure 8B:
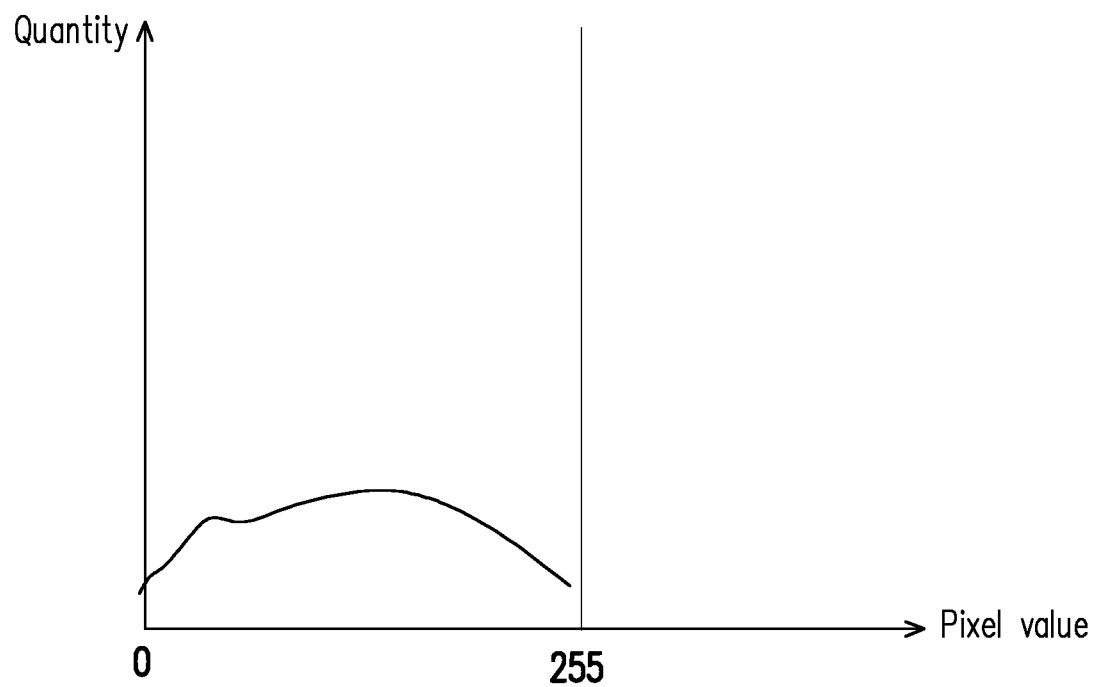

More specifically, FIG. 7 is a detailed flowchart of Step S207 according to an embodiment of the invention. FIGS. 8A and 8B are schematic views illustrating pixel value conversion according to an embodiment of the invention.

Referring to FIG. 7 and FIGS. 8A and 8B, first of all, the processor 20 may perform an statistical operation the pixel values of the first pixels to obtain a quantity distribution of the pixel values of the first pixels in a value domain (also referred to as a first value domain) (Step S701). For example, the processor 20 may perform a statistical operation on the first pixels in the second image to generate a quantity distribution of the first pixels in the first value domain (e.g., pixel values ranging from 0 to 400) as shown in FIG. 8A.

Then, the processor 20 may obtain a plurality of pixels (also referred to as fifth pixels) in the first pixels according to the quantity distribution (Step S703). In addition, the pixel values of the fifth pixels are greater than a first pixel value and less than a second pixel value. For example, in FIG. 8A, the first pixel value is "50", and the second pixel value is "350". In the embodiment, pixels (also referred to as sixth pixels) whose pixel values are not greater than the first pixel value account for a first percentage M_P of the total number of the first pixels, and pixels (also referred to as seventh pixels) whose pixel values are not less than the second pixel value account for a second percentage N_P of the total number of the first pixels. The first percentage M_P and the second percentage N_P may be manually set in advance. The processor 20 may further learn the first pixel value and the second pixel value according to the quantity distribution of FIG. 8A, the first percentage M_P, and the second percentage N_P.

Then, the processor 20 may respectively convert the pixel values of the fifth pixels to other corresponding pixel values in another value domain (e.g., pixel values ranging from 0 to 255) through linear projection, and generate the output image according to the converted pixel values (Step S705). Details concerning the linear projection are already available in the conventional art, and therefore will not be repeated in the following. Besides, the pixel values of the sixth pixels are respectively set as 0 in the output image, and the pixel values of the seventh pixels are respectively set as 255 in the output image. It should be noted that, through Steps S701 to S705, the pixel values of the fifth pixels may be mapped to another value domain while protecting the details in light and dark areas in the image.

In view of the foregoing, the image outputting method and the electronic device according to the embodiments of the invention may determine the exposure duration according to the degree of hand vibration at the moment when the camera captures an image and further shoot a plurality of short exposure images having different exposure durations. Then, the short exposure images are synthesized into the output image having the same brightness as that of a long exposure image. In this way, the output image may have the same brightness as that of the long exposure image while exhibiting reduced noise and preserving image details. Besides, in the embodiments of the invention, the exposure duration of the short exposure image is dynamically determined. Therefore, a short exposure image having a longer exposure duration may be obtained. Consequently, the number of short exposure images that need to be shot is reduced, and the issue of having an excessively high error rate due to performing motion compensation on an excessive number of short exposure images is also alleviated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image outputting method for an electronic device, the method comprising:

shooting a scene by respectively using a plurality of different exposure durations to obtain a plurality of images, wherein shooting the scene by respectively using the different exposure durations to obtain the images comprises:
  determining whether a third image to be shot among the images contains blurredness resulting from motion;
  shooting the scene by using a first exposure duration to obtain the third image when the third image to be shot contains the blurredness resulting from the motion, wherein after obtaining the third image, the image outputting method further comprises:
  determining whether a brightness summation of the third image reaches a target brightness; and
  making a determination again on whether the third image to be shot among the images contains the blurredness resulting from the motion when the brightness summation of the third image does not reach the target brightness;
  performing a summation operation according to the images to obtain a first image;
  adjusting a first brightness of the first image to an output brightness to generate a second image;
  respectively converting pixel values of a plurality of first pixels in the second image into other corresponding pixel values in another value domain to generate an output image; and
  outputting the output image.

2. The image outputting method as claimed in claim 1, wherein shooting the scene by respectively using the different exposure durations to obtain the images comprises:
  shooting the scene by using a second exposure duration to obtain the third image when the third image to be shot does not contain the blurredness resulting from the motion, wherein the second exposure duration is greater than the first exposure duration.

3. The image outputting method as claimed in claim 1, wherein performing the summation operation according to the images to obtain the first image comprises:
  choosing a base image of the images, calculating a brightness of a second pixel in the base image, and initially setting an accumulated value as the brightness of the second pixel;
  choosing a reference image of the images and calculating a brightness of a third pixel corresponding to the second pixel in the reference image;
  calculating an image difference according to the second pixel and the third pixel;
  determining whether the image difference is less than a first threshold and whether the brightness of the third pixel is greater than a second threshold;
  updating the accumulated value according to a summation of the accumulated value and a pixel value of the third pixel when the image difference is less than the first threshold and the brightness of the third pixel is greater than the second threshold;
  updating the accumulated value according to a summation of the accumulated value and a first value when the image difference is not less than the first threshold or the brightness of the third pixel is not greater than the second threshold; and
  setting the accumulated value as a pixel value of a fourth pixel corresponding to the second pixel in the first image.

4. The image outputting method as claimed in claim 3, wherein the first value is obtained by multiplying a pixel value of the second pixel by a first ratio, and the first ratio is a quotient of dividing a second brightness of the reference image by a third brightness of the base image.

5. The image outputting method as claimed in claim 1, wherein adjusting the first brightness of the first image to the output brightness to generate the second image comprises:
  obtaining a second ratio, wherein the second ratio is a quotient of dividing a predetermined output brightness by the first brightness; and
  multiplying the second ratio by the first brightness to obtain the output brightness.

6. The image outputting method as claimed in claim 1, wherein respectively converting the pixel values of the first pixels in the second image into the other corresponding pixel values in the another value domain to generate the output image comprises:
  performing a statistical operation on the pixel values of the first pixels to obtain a quantity distribution of the pixel values of the first pixels in a first value domain;
  obtaining a plurality of fifth pixels of the first pixels according to the quantity distribution, wherein pixel values of the fifth pixels are greater than a first pixel value and less than a second pixel value; and
  respectively converting the pixel values of the fifth pixels into the other corresponding pixel values in the another value domain to generate the output image.

7. An electronic device, comprising:
  an image capturer; and
  a processor, wherein:
  the image capturer shoots a scene by respectively using a plurality of different exposure durations to obtain a plurality of images, wherein in shooting the scene by respectively using the different exposure durations to obtain the images,
    the processor determines whether a third image to be shot among the images contains blurredness resulting from motion,
    the processor shoots the scene by using a first exposure duration to obtain the third image when the third image to be shot contains the blurredness resulting from the motion, wherein after obtaining the third image,
    the processor determines whether a brightness summation of the third image reaches a target brightness, and
    the processor makes a determination again on whether the third image to be shot among the images contains the blurredness resulting from the motion when the brightness summation of the third image does not reach the target brightness,
  the processor performs a summation operation according to the images to obtain a first image,
  the processor adjusts a first brightness of the first image to an output brightness to generate a second image,
  the processor respectively converts pixel values of a plurality of first pixels in the second image into other corresponding pixel values in another value domain to generate an output image, and
  the processor outputs the output image.

8. The electronic device as claimed in claim 7, wherein in shooting the scene by respectively using the different exposure durations to obtain the images,
  the processor shoots the scene by using a second exposure duration to obtain the third image when the third image to be shot does not contain the blurredness resulting from the motion, wherein the second exposure duration is greater than the first exposure duration.

9. The electronic device as claimed in claim 7, wherein in performing the summation operation according to the images to obtain the first image, the processor chooses a base image of the images, calculates a brightness of a second pixel in the base image, and initially sets an accumulated value as the brightness of the second pixel, the processor chooses a reference image of the images and calculates a brightness of a third pixel corresponding to the second pixel in the reference image, the processor calculates an image difference according to the second pixel and the third pixel, the processor determines whether the image difference is less than a first threshold and whether the brightness of the third pixel is greater than a second threshold, the processor updates the accumulated value according to a summation of the accumulated value and a pixel value of the third pixel when the image difference is less than the first threshold and the brightness of the third pixel is greater than the second threshold, the processor updates the accumulated value according to a summation of the accumulated value and a first value when the image difference is not less than the first threshold or the brightness of the third pixel is not greater than the second threshold, and the processor sets the accumulated value as a pixel value of a fourth pixel corresponding to the second pixel in the first image.

10. The electronic device as claimed in claim 9, wherein the first value is obtained by multiplying a pixel value of the second pixel by a first ratio, and the first ratio is a quotient of dividing a second brightness of the reference image by a third brightness of the base image.

11. The electronic device as claimed in claim 7, wherein in adjusting the first brightness of the first image to the output brightness to generate the second image, the processor obtains a second ratio, wherein the second ratio is a quotient of dividing a predetermined output brightness by the first brightness, and the processor multiplies the second ratio by the first brightness to obtain the output brightness.

12. The electronic device as claimed in claim 7, wherein in respectively converting the pixel values of the first pixels in the second image into the other corresponding pixel values in the another value domain to generate the output image, the processor performs a statistical operation on the pixel values of the first pixels to obtain a quantity distribution of the pixel values of the first pixels in a first value domain, the processor obtains a plurality of fifth pixels of the first pixels according to the quantity distribution, wherein pixel values of the fifth pixels are greater than a first pixel value and less than a second pixel value, and the processor respectively converts the pixel values of the fifth pixels into the other corresponding pixel values in the another value domain to generate the output image.

* * * * *